(12) United States Patent
Elliott et al.

(10) Patent No.: US 7,961,015 B2
(45) Date of Patent: Jun. 14, 2011

(54) TRANSCEIVER AND METHOD FOR OPERATING THE TRANSCEIVER

(75) Inventors: Mark Elliott, Grasslfing/Pentling (DE);
Christoph Kleiner, Regensburg (DE);
Wolfgang Reiml, Regensburg (DE);
Dieter Saβ, Regensburg (DE); Peter Turban, Maxhütte-Haidhof (DE);
Herbert Zimmer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 1581 days.

(21) Appl. No.: 10/888,770

(22) Filed: Jul. 9, 2004

(65) Prior Publication Data
US 2005/0012393 A1 Jan. 20, 2005

(30) Foreign Application Priority Data
Jul. 9, 2003 (DE) .................. 103 31 059

(51) Int. Cl.
*H03B 1/00* (2006.01)
*H03B 3/00* (2006.01)
(52) U.S. Cl. .................. 327/110; 327/112
(58) Field of Classification Search .......... 327/108, 327/110–112; 326/87
See application file for complete search history.

(56) References Cited

U.S. PATENT DOCUMENTS

| 3,663,940 | A | * | 5/1972 | Schwarz | 363/28 |
|---|---|---|---|---|---|
| 5,095,224 | A | * | 3/1992 | Renger | 327/110 |
| 5,216,300 | A | * | 6/1993 | Wabuka | 326/87 |
| 5,410,262 | A | * | 4/1995 | Kang | 327/108 |
| 5,483,551 | A | * | 1/1996 | Huang et al. | 375/219 |
| 5,963,047 | A | * | 10/1999 | Kwong et al. | 326/27 |
| 6,140,848 | A | * | 10/2000 | Harvey | 327/112 |
| 6,484,714 | B1 | * | 11/2002 | Smith | 126/525 |
| 6,826,369 | B1 | * | 11/2004 | Bondarev et al. | 398/107 |
| 6,873,860 | B2 | * | 3/2005 | Hildebrand et al. | 455/561 |
| 7,098,703 | B2 | * | 8/2006 | Harvey | 327/111 |

FOREIGN PATENT DOCUMENTS

| DE | 37 17 109 A1 | 12/1987 |
|---|---|---|
| DE | 195 46 171 C1 | 11/1996 |
| DE | 198 00 565 A1 | 7/1999 |
| DE | 694 23 209 T2 | 10/2000 |
| EP | 0 872 963 A1 | 10/1998 |
| WO | WO97/04201 | 2/1997 |

\* cited by examiner

*Primary Examiner* — Quan Tra
(74) *Attorney, Agent, or Firm* — King & Spalding L.L.P.

(57) ABSTRACT

The transceiver features a fast de-excitation circuit, by means of which the transceiver can be very quickly de-energized or de-excited after sending of signals. The fast de-excitation circuit can be realized in the simplest case as a controllable switch with series-connected resistor. The transceiver is thus ready to receive signals again very fast, i.e. in the range of a few oscillation periods. With bidirectional data communication between transceiver and transponder the danger of malfunctions is avoided or at least reduced to a minimum level.

20 Claims, 3 Drawing Sheets

TRANSCEIVER AND METHOD FOR OPERATING THE TRANSCEIVER

PRIORITY

This application claims priority to German Application No. 103 31 059.2 filed Jul. 9, 2003.

TECHNICAL FIELD OF THE INVENTION

The invention relates to a transceiver for a device for inductive data transmission, especially to an anti-theft device in a motor vehicle, as well as to a method for operating such a transceiver. The invention further relates to an anti-theft system.

BACKGROUND OF THE INVENTION

Modern anti-theft devices for motor vehicles use electronic immobilizers which employ transponder technology. With such electronic immobilizers there is data communication between a transceiver arranged in the motor vehicle and a transponder arranged for example in a key or a key fob of the vehicle user. Before the motor vehicle is started up coded data is first exchanged which ensures that only an authorized person, for example the owner of the motor vehicle, can start it.

Such an anti-theft system for use in motor vehicles in which data communication is established using a magnetic coupling between a transceiver and a transponder is described in Patent DE 195 46 171 C1. Data is transferred for example between transceiver and transponder by an alternating field created magnetically by the transceiver being switched on and off according to the data code to be transferred. For these purposes the transceiver features an oscillating circuit which is excited via a driver circuit the inductance of this oscillating circuit is coupled magnetically with a corresponding inductance of the transponder oscillating circuit. Data communication between transceiver and transponder is bidirectional and uses the relevant oscillating circuits of transceiver and transponder. For this data communication an interrogation signal is first sent from the stationary transceiver to the transponder. The energy transmitted in this case can be stored in an energy store and when sufficient energy is present in the transponder the response code signal is triggered.

After sending the transceiver will be switched off by connecting the oscillating circuit to a reference potential. The oscillating circuit then oscillates in accordance with its quality. This decay process lasts a relatively long time (in the area of around 20 oscillations). The transponder now oscillates at its own resonant frequency and thus independently of the send frequency of the transceiver. After this phase independent of the data code to be transmitted, in which the transceiver is switched off, the transmitter unit of the transceiver is switched on again. To suppress damaging interference between the send signal of the transceiver and the inherent oscillations of the transponder the transceiver must be switched back on again in the correct phase with the inherent resonant frequency of the transponder. For this to be done it is necessary for the transceiver to be able to receive this signal frequency of the transponder before the driver circuit of the transceiver is switched back on.

These received signals are however generally signals with a very small amplitude. Furthermore the OFF phases in which the driver circuit of the transceiver is switched off cannot be changed at random according to the transmission rate. It must therefore be ensured that after the signal amplitude is sent a residual oscillation to be found in the transceiver is decayed to negligibly small values during these OFF phases of the driver circuit of the transceiver.

The problematic aspect of this is that the time taken for the oscillating circuit to decay is often too long and the transponder for its part is already ready in this period to send coded data back to the transceiver. A further problem arises from the fact that after the transceiver or its driver circuit is switched on, aperiodic oscillations can occur even long after decay process because of charge still stored in the capacitor of the transceiver oscillating circuit. This problem is described in greater detail using FIG. 3.

For data transmission of an interrogation code signal the transceiver oscillating circuit is excited with a square wave voltage UT. Depending on the layout of the oscillating circuit, an oscillating current I with amplitude I' is established. After the interrogation code has been sent by the transceiver, the driver circuit is switched of at point $T_{AUS}$. To do this the corresponding switch is initially opened. The driver circuit is now at high resistance and is in the tristate condition. The oscillating circuit current thus flows over corresponding free-running diodes switched in parallel with the switches. This leads to a phase reversal of the driver voltage UT. This contraphase voltage very quickly de-excites the oscillating circuit, which causes the oscillating circuit current to assume the value of 0 amperes after very few periods. However a potential remains at the output of the driver circuit which corresponds to the residual voltage UC over the capacitor of the oscillating circuit. If the oscillating circuit is now to be set to receive, the reference potential side controllable switch of the bridge circuit is switched on so that the output of the bridge circuit is switched to ground. As a result of the residual voltage UC via the capacitor this leads to a new transient oscillation of current I. These transient oscillations of the current I lead to interferences with the signal sent by the transponder and received by the transceiver oscillating circuit. Since these received signals are typically transmitted at a low power and thereby also exhibit a lower amplitude, as a result of the interference with the periodically decaying residual signal there are malfunctions in data communication.

This problem can be worked around by selecting the times between receiving and transmitting to be large enough, which however leads to the maximum allowable data transmission rate between transceiver and transponder being limited. This is however frequently not desirable since it would mean that data communication between transceiver and transponder would take a very long time.

The above problem can further be worked around by a reduction of the maximum permissible oscillating circuit quality of the transceiver. Although this allows data to be transmitted more quickly, the reduction of the oscillating circuit quality goes hand-in-hand with other, secondary problems which one attempts to reduce by other measures. For example the relevant oscillating circuits as well as the activation circuits would have to be dimensioned very much larger, which on the one hand would lead directly to a greater energy consumption. In addition this would be a disadvantage in relation to costs.

SUMMARY OF THE INVENTION

The object of the present invention is thus to return a transceiver very quickly to receive mode after transmission without this leading to errors or disturbances in the receipt of data.

In accordance with the invention this object can be achieved by a transceiver for a device for inductive data transmission, especially for an anti-theft device in a motor vehicle, comprising an oscillating circuit for transmitting and receiving data signals, a driver circuit which is arranged between a first supply connection with a first supply potential and a second supply connection with a second supply potential and which is linked on the output side to the oscillating circuit, a control circuit which activates the driver circuit such that the oscillating circuit is excited for the transmission of the data signals with a frequency, and a de-excitation circuit arranged in parallel to the oscillating circuit and able to be activated by the control circuit, which in the activated state undertakes a de-energization of the energy stores of the oscillating circuit.

The de-excitation circuit may comprise a controllable switch which is arranged between an output of the driver circuit and the second supply connection. A resistor can be arranged between the controllable switch and the output, where the impedance of the resistor is dimensioned in relation to the specified overall impedance of the oscillating circuit so an aperiodic attenuation is present for de-excitation. The first supply connection may comprise a positive supply potential and the second supply connection comprises the potential of the reference ground. The oscillating circuit may comprise at least one inductive element for transmitting and receiving signals. The oscillating circuit can be embodied as an LCR series oscillating circuit, in which at least one capacitive element, at least one inductive element and at least one resistive element are arranged in series with one another. The oscillating circuit can be embodied as an LCR parallel oscillating circuit, and wherein at least one capacitive element and at least one inductive element are arranged in parallel with one another. The driver circuit can be embodied as a bridge circuit, especially as a half-bridge circuit, and wherein a parallel circuit consisting of de-excitation circuit and oscillating circuit is arranged between the output and the second supply connection. The driver circuit may comprise controllable switches, especially MOSFETs. A free-running diode can be arranged in each case in parallel to the controlled paths of the controllable switches.

The object can furthermore be achieved by a method for operating a transceiver comprising a driver circuit as well as a downstream oscillating circuit arranged on the output side of the driver circuit which is designed for transmitting and receiving signals, the method comprising the steps of:

(a) blocking all switches of the driver circuit;
(b) to excite the oscillating circuit, connecting the output of the driver circuit and thus the input of the oscillating circuit via an attenuating resistor for a first period with a reference potential;
(c) setting the oscillating circuit is subsequently for receiving signals.

The underlying idea behind the present invention consists of equipping the transceiver of a device for inductive data transmission with a fast de-excitation circuit. By means of this fast de-excitation circuit in accordance with the invention it is possible to ensure that a residual oscillation amplitude of the residual voltage dropping off via the oscillating circuit of the transceivers has decayed after transmission of coded signals within a very short time to very small amplitudes. In addition it is possible to ensure in this way that this oscillating circuit can receive again within the shortest time after the transmission of the coded signals sent by the transponder, even if these signals exhibit a very much smaller signal amplitude compared to the transceiver's transmitted signals. Thus there is no resulting interference by the received signal with the residual oscillations in the transceiver's oscillating circuit since the latter is already completely de-excited and thus does not have any stored energy in the capacitive and inductive storage elements of the transceiver oscillating circuit.

The transmit elements of the transponder can thus be designed so that a transmit signal which is small in relation to its transmit power is emitted, which can be accepted and decoded in a defined way, i.e. without functional disturbance, by the transceiver. The local energy supply of the transponder, i.e. the charge capacitor, can thus be dimensioned very small since the transmit signal emitted at low transmit power can also be received in a defined way.

In an especially advantageous embodiment the driver circuit of the transceiver is blocked immediately after the transmission of coded signals from the transceiver to the transponder and as far as possible the de-excitation circuit of the transceiver is blocked simultaneously or at least immediately afterwards. The oscillating circuit is thus de-energized immediately after transmission to the transponder within just a few oscillation amplitudes. If the transceiver is now switched over to receive, this ensures that any oscillations which my be present have already long decayed before the coded signals sent by the transponder are accepted by the oscillating circuit of the transceiver.

The transceiver in accordance with the invention is particularly advantageously suited to use in an anti-theft system in a motor vehicle.

Advantageous embodiments and developments can be taken the description while referring to the drawings.

BRIEF DESCRIPTION OF THE DRAWINGS

The invention is described in more detail below on the basis of the exemplary embodiments specified in the schematic figures of the drawing. The diagrams show.

DETAILED DESCRIPTION OF EMBODIMENTS

Figure 1:
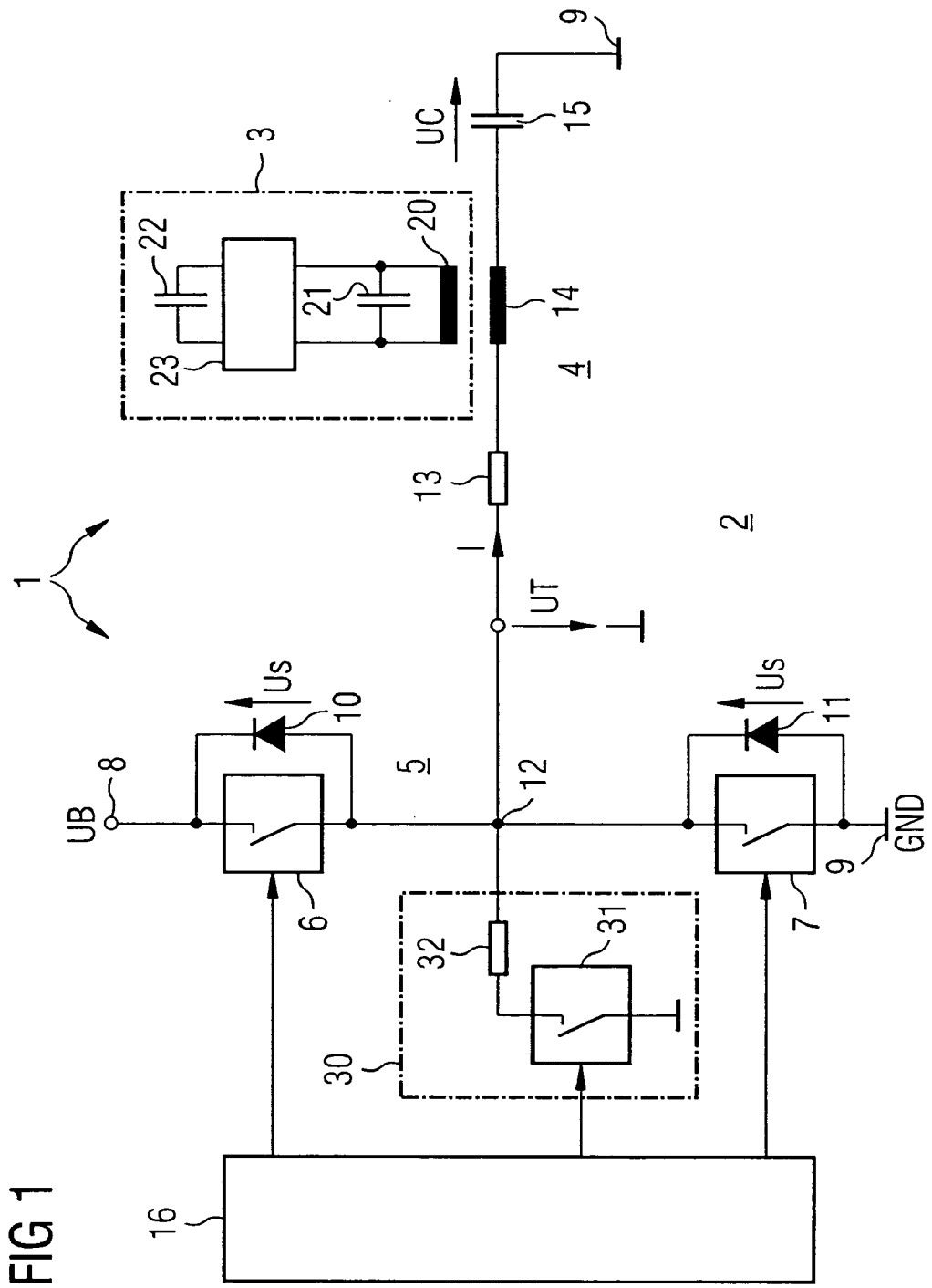
FIG. 1—a schematic block diagram of the inventive anti-theft system with transceiver and transponder.

In the figures of the drawing identical elements or elements with the same functions have been labeled with the same reference numbers.

In FIG. 1 for example the inventive anti-theft system, for example for use in a motor vehicle, is labeled 1. The inventive anti-theft system 1 features a stationary transceiver 2 arranged in the motor vehicle for example which interoperates with a portable transponder 3 via a transformational inductive link if the transponder 3 is located in the proximity of the transceiver 2.

FIG. 1 in this case merely shows a section of transceiver 2. For energy transmission and for receiving data, transceiver 2 features an oscillating circuit 4—also referred to below as a transceiver oscillating circuit. This oscillating circuit 4 is excited by a driver circuit 5 which for its part is controlled by a control circuit 16. The control circuit 16 can for example be embodied as a component of a program-controlled unit. A microprocessor or microcontroller, which is implemented for example in a control unit, can be provided as a program-controlled unit.

In the present exemplary embodiment driver circuit 5 is embodied as a half-bridge circuit and features two controllable switches 6, 7. The control connections of these controllable switches 6, 7 are connected to control circuit 16 and can be activated by the corresponding control signals. The controlled paths of the controllable switches 6, 7 are connected in series with each other, with these series connections being arranged between a first supply connection 8 and a second supply connection 9. The first supply connection 8 has a first supply potential UB, for example a positive battery potential and the second supply connection 9 has a second supply potential GND, for example the potential of the reference ground. A free-running diode 10, 11 is arranged in parallel to the controlled paths of controllable switches 6, 7 in each case. Where the controllable switches 6, 7 are embodied as MOSFET transistors it is also possible to dispense with these free-running diodes 10, 11 since a MOSFET transistor always also features a free-running diode integrated into the substrate of the MOSFET. The controllable switches 6, 7 can however also be embodied in any other way, for example as IGBTs, bipolar transistors, etc.

The center tap 12 between the controlled paths of the controllable switches 6, 7 forms the output of the bridge circuit 5. The transceiver potential UT can be tapped off at output 12 so to excite the series oscillating circuit 4 current I flows through the oscillating circuit 4.

The oscillating circuit 4 is embodied in the present exemplary embodiment as a series oscillating circuit and features a resistor 13, an inductive element 14, for example a coil, and a capacitive element 15, for example a capacitor. The oscillating circuit 4 is thus embodied as an LCR oscillating circuit and is arranged between the output 12 of the bridge circuit 5 and the supply connection 9. The coil 14 and the capacitor 15 in this case to some extent form an antenna for transmitting and receiving. The oscillating circuit can however be arranged in any other way, as an LC parallel oscillating circuit for example.

The transponder 3 also features an oscillating circuit—also referred to below as a transponder oscillating circuit—where the transponder oscillating circuit features a coil 20 and a capacitor 21 which are arranged in parallel. The transponder 3 further features a charge capacitor 22 which is charged by a energy-rich oscillation of the transceiver 2, which is accepted by the transponder oscillating circuit 20, 21. The transponder 3 further features a control unit 23 typically embodied as an integrated circuit which controls the charging of the charge capacitor 22 as well as data communication between transponder 3 and transceiver 2.

In accordance with the invention the transceiver 2 features a de-excitation circuit 30 via which a complete de-energization or de-excitation of all energy stores 14, 15 of the transceiver oscillating circuit 4 can be undertaken in a very short time. The de-excitation circuit 30 is arranged between the output 12 of the bridge circuit 5 and the connection 9 for the reference potential GND. The center tap 12 of the bridge circuit 5 thus also forms the output of de-excitation circuit 30. The de-excitation circuit 30 is further controlled by the control circuit 16. In the simplest case the de-excitation circuit 30 can be embodied as a controllable switch 31 for which the controllable path is arranged between the output 12 and the connection 9. This controllable switch 31 can accordingly also be embodied as a MOSFET or also as a bipolar transistor.

Typically a high-impedance element 32 having a resistive effect is connected between the load output of the controllable switch 31 and the output 12 of the de-excitation circuit 30. The resistive element 32 typically embodied as a resistor is advantageously tuned to elements 13, 14, 15 of the series oscillating circuit 4. It is important here for the impedance of resistor 32, depending on the impedances of the oscillating circuit elements 13, 14, 15 to be dimensioned so that, when the controllable switch 31 is switched on, an aperiodic attenuation of the current I or of the potential UT is established. This can be determined through simulation for example or also empirically from the formula for the decay process for the aperiodic limit case. Because of the tolerances involved the impedance of the resistance 32 should be selected so that for each possible combination of values of the impedances of the oscillating circuit 4 an aperiodic attenuation is established. In this way a loss of time can advantageously be avoided, which would arise with the reversal of the sign of oscillating circuit current I.

Figure 2:
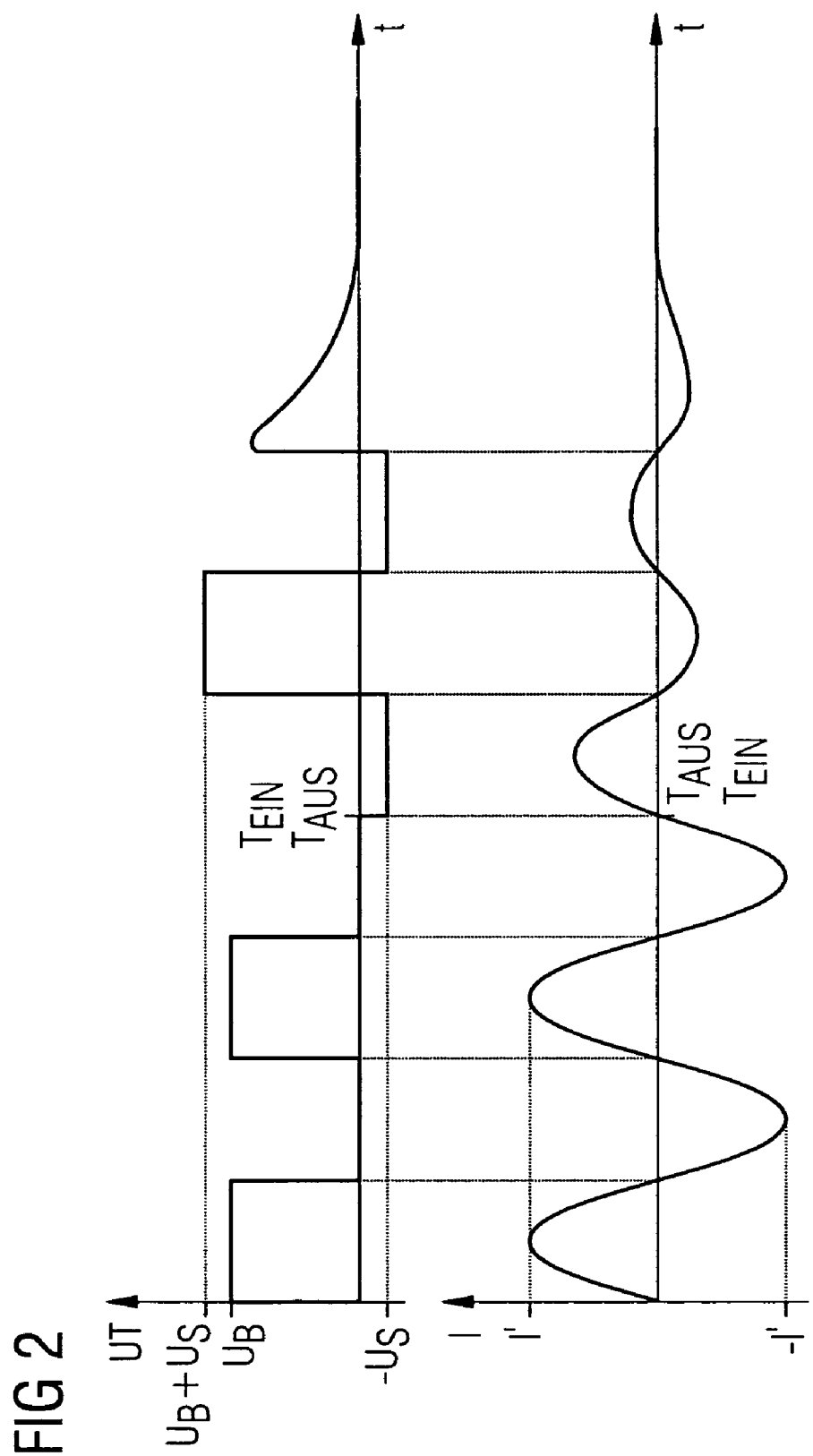
FIG. 2—Signal-time diagram for the drop-off in voltage on the transceiver-side oscillating circuit as well as current flowing through this oscillating circuit for a transceiver embodied in accordance with the invention.
Figure 3:
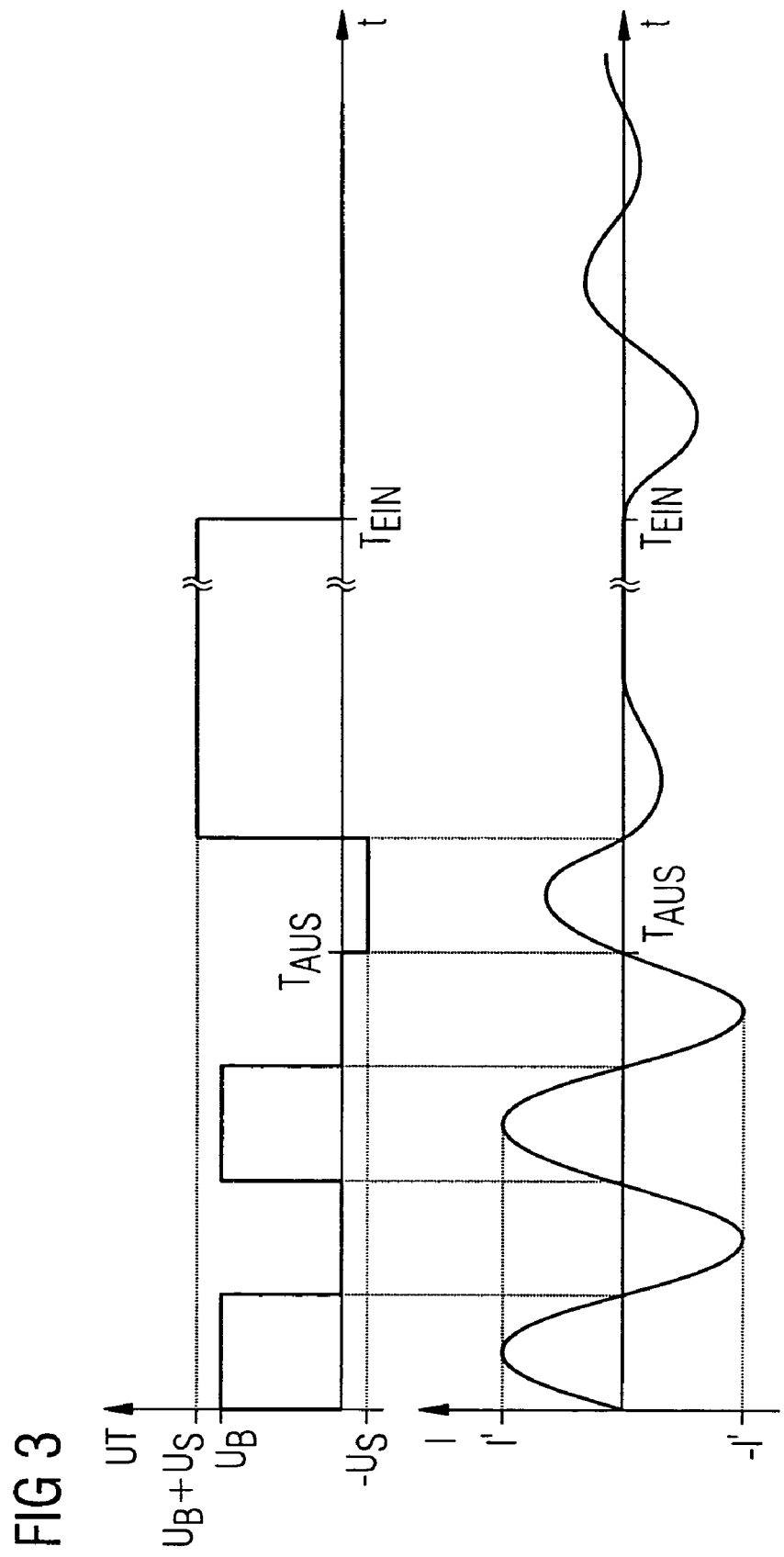
FIG. 3—Signal-time diagram for the drop-off in voltage on the transceiver-side oscillating circuit as well as current flowing through this oscillating circuit for a known transceiver.

The general functions of data communication between transceiver 2 and transponder 3 will first be explained below. Then the function of the transceiver 2 in accordance with the invention and especially of the de-excitation circuit 30 will be described in detail on the basis of the signal-time diagram in FIG. 2.

The transceiver 2 generates a magnetic alternating field which oscillates at a pre-specified frequency and by which an interrogation code signal is transmitted to transponder 3. This interrogation code signal is formed by an energy-rich oscillation with the energy of which the charge capacitor 22 (or also a rechargeable battery) in the Transponder 3 is charged. If sufficient energy is loaded into the charge capacitor 22 and the alternating field created by transceiver 2 is switched off, the transponder 3 begins to oscillate, whereby, using the oscillating circuit 20, 21 coded signals can be transmitted back to transceiver 2. These returned coded signals are accepted by the transceiver oscillating circuit 4.

This data transmission or return data transmission between transceiver 2 and transponder 3 is undertaken by inductive coupling of the two coils 14, 20 for example at the point at which the two oscillating circuits 4; 20, 21 are in the immediate vicinity of each other. This is for example the case when transponder 2 is arranged on an ignition key and the transceiver oscillating circuit 4 for example is wound around the ignition lock of the motor vehicle. As soon as the ignition key is inserted into the ignition lock and the ignition key is turned, the two coils 14, 20 are coupled to each other electrically. As a result of turning the ignition key the dialog described above between transponder 3 and transceiver 2 is initiated and executed. An immobilizer or an anti-theft system can be deactivated in this way.

For data transmission of an interrogation code signal the transceiver oscillating circuit 4 is excited with a square wave voltage UT. Depending on the layout of the oscillating circuit, an oscillating current I with amplitude I' is set up. If now, after the interrogation code signal has been sent by transceiver 2, the oscillating circuit 4 is set to receive, the driver circuit 5 is blocked at point $T_{AUS}$. This is done by opening controllable switched 6, 7. Thus current no longer flows through controllable switches 6, 7 and a high-impedance tristate condition of the oscillating circuit 4 thus occurs. The energy or the oscillating circuit current I in the oscillating circuit is initially reduced via free-running diode 10, since this diode 10 is now switched in the operate direction. This leads to a phase reversal of the driver voltage UT. This contraphase voltage very quickly de-excites the oscillating circuit, which causes the oscillating circuit current I to assume the value of 0 amperes after very few periods. However a residual potential remains at output 12 which corresponds to the residual charge UC stored in the capacitor 15.

Simultaneously with point $T_{AUS}$ at which the bridge circuit is blocked, or at least shortly afterwards, at a point $T_{EIN}$ the de-excitation circuit 30 is switched on by closing switch 31. Initially the discharge current mainly flows via the free-running diodes 10, 11, since resistor 32 features a higher impedance compared to the diode. After a few, for example one or two oscillations of the current I, the oscillation circuit energy is reduced to such a level that the free-running diode 10 is no longer made to conduct. Thereafter the residual charge in the oscillating circuit 4, especially the residual voltage UC loaded into the capacitor 15, is reduced completely and very quickly via resistor 32. The entire discharge or de-excitation process thus merely lasts around 2-3 oscillations.

A de-energization or de-excitation of the oscillating circuit 4 thus occurs immediately and very quickly after the interrogation code signal has been transmitted between transceiver 2 and transponder 3. In this case the energy stores of the oscillating circuit 4, especially the capacitor 15, are discharged in the shortest possible time. The transceiver oscillating circuit 4 can thus be switched over to reading in a very short time and is thus available for receiving coded signals of the transponder 3.

Although the present invention describes examples using a preferred exemplary embodiment it is not restricted to this embodiment but can be modified in any way.

Thus the invention is not necessarily restricted to a transceiver for an anti-theft device, but can advantageously be used for all transceivers for devices for inductive data transmission. For example the transceiver can be used for a PASE system (PASE=PAssive Start and Entry) of an immobilizer, of a tire guard, etc.

It is taken as read that the specified concrete circuit technology variant merely represents one possible exemplary embodiment which can be modified very simply by exchanging simple components. For example an LCR series oscillating circuit is not necessarily required for inductive data transmission, but a parallel oscillating circuit can also be provided here. In addition a resistive and/or capacitive element does not necessarily have to be present in this LCR oscillating circuit. The driver circuit can also be embodied not as a half-bridge circuit but as a full-bridge circuit or another circuit with similar or equivalent functionality.

We claim:

1. A transceiver for a device for inductive data transmission, especially for an anti-theft device in a motor vehicle, comprising:
   an oscillating circuit for transmitting and receiving data signals,
   a driver circuit which is arranged between a first supply connection with a first supply potential and a second supply connection with a second supply potential and which is linked on the output side to the oscillating circuit,
   a control circuit which in a transmission mode activates the driver circuit such that the oscillating circuit is excited for the inductive transmission of the data signals with a frequency and in a reception mode decouples the driver circuit from the oscillating circuit, and
   a de-excitation circuit arranged in parallel to the oscillating circuit wherein the de-excitation circuit is activated by the control circuit during the reception mode for de-energization of the energy stores of the oscillating circuit.

2. The transceiver in accordance with claim 1, wherein the de-excitation circuit comprises a controllable switch which is arranged between of a output of the driver circuit and the second supply connection.

3. The transceiver in accordance with claim 2, wherein a resistor is arranged between the controllable switch and the output, where the impedance of the resistor is dimensioned in relation to the specified overall impedance of the oscillating circuit so an aperiodic attenuation is present for de-excitation.

4. The transceiver in accordance with claim 1, wherein the first supply connection comprises a positive supply potential and the second supply connection comprises the potential of the reference ground.

5. The transceiver in accordance with claim 1, wherein the oscillating circuit comprises at least one inductive element for transmitting and receiving signals.

6. The transceiver in accordance with claim 1, wherein the oscillating circuit is embodied as an LCR series oscillating circuit, in which at least one capacitive element, at least one inductive element and at least one resistive element are arranged in series with one another.

7. The transceiver in accordance with claim 1, wherein the oscillating circuit is embodied as an LCR parallel oscillating circuit, and wherein at least one capacitive element and at least one inductive element are arranged in parallel with one another.

8. The transceiver in accordance with claim 1, wherein the driver circuit is embodied as a bridge circuit, especially as a half-bridge circuit, and wherein a parallel circuit consisting of de-excitation circuit and oscillating circuit is arranged between the output and the second supply connection.

9. The transceiver in accordance with claim 1, wherein the driver circuit comprises controllable switches, especially MOSFETs.

10. The transceiver in accordance with claim 9, wherein a free-running diode is arranged in each case in parallel to the controlled paths of the controllable switches.

11. A method for operating an inductive transceiver comprising a driver circuit comprising first and second switches for coupling first and second supply potentials with a downstream oscillating circuit arranged on the output side of the driver circuit which is designed for inductively transmitting and receiving signals, the method comprising the steps of:
   (a) blocking the first and second switches of the driver circuit;
   (b) to de-excite the oscillating circuit, connecting the output of the driver circuit and thus the input of the oscillating circuit via an attenuating resistor for a first period with a reference potential;
   (c) setting the oscillating circuit subsequently for receiving signals.

12. An anti-theft device in a motor vehicle comprising a transceiver for inductive data transmission, comprising:
   an oscillating circuit for inductively transmitting and receiving data signals,
   a driver circuit which is arranged between a first supply connection with a first supply potential and a second supply connection with a second supply potential and which is linked on the output side to the oscillating circuit,
   a control circuit which in a transmission mode activates the driver circuit such that the oscillating circuit is excited for the inductive transmission of the data signals with a frequency and in a reception mode de-activates the driver circuit, and
   a de-excitation circuit arranged in parallel to the oscillating circuit wherein the de-excitation circuit is activated by the control circuit during the reception mode for de-energization of the energy stores of the oscillating circuit.

13. The anti-theft device in accordance with claim 12, wherein the de-excitation circuit comprises a controllable switch which is arranged between an output of the driver circuit and the second supply connection.

14. The anti-theft device in accordance with claim 13, wherein a resistor is arranged between the controllable switch and the output, where the impedance of the resistor is dimensioned in relation to the specified overall impedance of the oscillating circuit so an aperiodic attenuation is present for de-excitation.

15. The anti-theft device in accordance with claim 12, wherein the first supply connection comprises a positive supply potential and the second supply connection comprises the potential of the reference ground.

16. The anti-theft device in accordance with claim 12, wherein the oscillating circuit comprises at least one inductive element for transmitting and receiving signals.

17. The anti-theft device in accordance with claim 12, wherein the oscillating circuit is embodied as an LCR series oscillating circuit, in which at least one capacitive element, at least one inductive element and at least one resistive element are arranged in series with one another.

18. The anti-theft device in accordance with claim 12, wherein the oscillating circuit is embodied as an LCR parallel oscillating circuit, and wherein at least one capacitive element and at least one inductive element are arranged in parallel with one another.

19. The anti-theft device in accordance with claim 12, wherein the driver circuit is embodied as a bridge circuit, especially as a half-bridge circuit, and wherein a parallel circuit consisting of de-excitation circuit and oscillating circuit is arranged between the output and the second supply connection.

20. The anti-theft device in accordance with claim 12, wherein the driver circuit comprises controllable switches, especially MOSFETs.

* * * * *